(12) United States Patent
Fugere

(10) Patent No.: US 8,701,946 B1
(45) Date of Patent: *Apr. 22, 2014

(54) FLUID DISPENSE PUMP WITH DRIP PREVENTION MECHANISM AND METHOD FOR CONTROLLING SAME

(75) Inventor: Jeffrey P. Fugere, Sandown, NH (US)

(73) Assignee: DL Technology, LLC, Haverhill, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,703

(22) Filed: Jun. 27, 2012

Related U.S. Application Data

(63) Continuation of application No. 12/715,805, filed on Mar. 2, 2010, now Pat. No. 8,220,669, which is a continuation of application No. 11/328,328, filed on Jan. 9, 2006, now Pat. No. 7,694,857, which is a continuation of application No. 10/424,273, filed on Apr. 28, 2003, now Pat. No. 6,983,867.

(60) Provisional application No. 60/376,536, filed on Apr. 29, 2002.

(51) Int. Cl.
*G01F 11/20* (2006.01)
*G01F 11/00* (2006.01)

(52) U.S. Cl.
USPC ........ 222/413; 222/261; 222/386; 222/386.5; 222/1

(58) Field of Classification Search
USPC ............. 222/413, 261, 325, 182, 63, 53, 333, 222/389, 262, 263, 386, 386.5, 394, 241, 222/504, 107, 1
See application file for complete search history.

(56) References Cited

U.S. PATENT DOCUMENTS

| | | | |
|---|---|---|---|
| 1,746,604 A | 2/1930 | Piquerez |
| 2,933,259 A | 4/1960 | Raskin |
| 3,355,766 A | 12/1967 | Causemann |
| 3,394,659 A | 7/1968 | Van Alen |
| 3,425,414 A | 2/1969 | La Roche |
| 3,507,584 A | 4/1970 | Robbins, Jr. |
| 3,693,844 A | 9/1972 | Willeke |
| 3,734,635 A | 5/1973 | Blach et al. |
| 3,811,601 A | 5/1974 | Reighard et al. |
| 3,938,492 A | 2/1976 | Mercer, Jr. |
| 3,963,151 A | 6/1976 | North, Jr. |
| 4,004,715 A | 1/1977 | Williams et al. |
| 4,077,180 A | 3/1978 | Agent et al. |
| 4,116,766 A | 9/1978 | Poindexter et al. |
| 4,168,942 A | 9/1979 | Firth |
| 4,197,070 A | 4/1980 | Koschmann |
| 4,239,462 A | 12/1980 | Dach et al. |
| 4,258,862 A | 3/1981 | Thorsheim |
| 4,312,630 A | 1/1982 | Travaglini |
| 4,339,840 A | 7/1982 | Monson |

(Continued)

*Primary Examiner* — Kevin P Shaver
*Assistant Examiner* — Nicholas J Weiss
(74) *Attorney, Agent, or Firm* — Onello & Mello, LLP

(57) ABSTRACT

A material dispensing pump includes a drip prevention system and method so as to avoid undesired dripping of the dispensed fluid. In one example, the fluid path is sealed. Positive pressure is applied to the fluid during a dispensing operation to present the fluid to the auger-style pump at a desired rate. Between dispensing operations, or when dispensing is completed, the fluid is placed in suspension, for example by applying a negative pressure, thereby preventing the fluid from being inadvertently released at the dispense tip. In addition, following a dispensing operation, the pump dispensing controller can be programmed to reverse the rotation of the feed screw, in order to draw the material in a reverse direction and to further suspend the fluid.

17 Claims, 14 Drawing Sheets

(56) References Cited

U.S. PATENT DOCUMENTS

| | | |
|---|---|---|
| 4,346,849 A | 8/1982 | Rood |
| 4,377,894 A | 3/1983 | Yoshida |
| 4,386,483 A | 6/1983 | Schlaefli |
| 4,408,699 A | 10/1983 | Stock |
| 4,465,922 A | 8/1984 | Kolibas |
| 4,513,190 A | 4/1985 | Ellett et al. |
| 4,572,103 A | 2/1986 | Engel |
| 4,579,286 A | 4/1986 | Stoudt |
| 4,584,964 A | 4/1986 | Engel |
| 4,610,377 A | 9/1986 | Rasmussen |
| 4,705,218 A | 11/1987 | Daniels |
| 4,705,611 A | 11/1987 | Grimes et al. |
| 4,785,996 A | 11/1988 | Ziecker et al. |
| 4,803,124 A | 2/1989 | Kunz |
| 4,836,422 A | 6/1989 | Rosenberg |
| 4,859,073 A | 8/1989 | Howseman, Jr. et al. |
| 4,917,274 A | 4/1990 | Asa et al. |
| 4,919,204 A | 4/1990 | Baker et al. |
| 4,941,428 A | 7/1990 | Engel |
| 4,969,602 A | 11/1990 | Scholl |
| 5,002,228 A | 3/1991 | Su |
| 5,106,291 A | 4/1992 | Gellert |
| 5,130,710 A | 7/1992 | Salazar |
| 5,161,427 A | 11/1992 | Fukuda et al. |
| 5,176,803 A | 1/1993 | Barbuto et al. |
| 5,177,901 A | 1/1993 | Smith |
| RE34,197 E | 3/1993 | Engel |
| 5,265,773 A | 11/1993 | Harada |
| 5,348,453 A | 9/1994 | Baran et al. |
| 5,407,101 A | 4/1995 | Hubbard |
| 5,452,824 A | 9/1995 | Danek et al. |
| 5,480,487 A | 1/1996 | Figini et al. |
| 5,535,919 A | 7/1996 | Ganzer et al. |
| 5,553,742 A | 9/1996 | Maruyama et al. |
| 5,564,606 A | 10/1996 | Engel |
| 5,567,300 A | 10/1996 | Datta et al. |
| 5,699,934 A | 12/1997 | Kolcun et al. |
| 5,765,730 A | 6/1998 | Richter |
| 5,785,068 A | 7/1998 | Sasaki et al. |
| 5,795,390 A | 8/1998 | Cavallaro |
| 5,803,661 A | 9/1998 | Lemelson |
| 5,819,983 A | 10/1998 | White et al. |
| 5,823,747 A | 10/1998 | Ciavarini et al. |
| 5,833,851 A | 11/1998 | Adams et al. |
| 5,837,892 A | 11/1998 | Cavallaro et al. |
| 5,886,494 A | 3/1999 | Prentice et al. |
| 5,903,125 A | 5/1999 | Prentice et al. |
| 5,904,377 A | 5/1999 | Throup |
| 5,918,648 A | 7/1999 | Carr et al. |
| 5,925,187 A | 7/1999 | Freeman et al. |
| 5,927,560 A | 7/1999 | Lewis et al. |
| 5,931,355 A | 8/1999 | Jefferson |
| 5,947,022 A | 9/1999 | Freeman et al. |
| 5,947,509 A | 9/1999 | Ricks et al. |
| 5,957,343 A | 9/1999 | Cavallaro |
| 5,971,227 A | 10/1999 | White et al. |
| 5,984,147 A | 11/1999 | Van Ngo |
| 5,985,029 A | 11/1999 | Purcell |
| 5,985,216 A | 11/1999 | Rens et al. |
| 5,992,688 A | 11/1999 | Lewis et al. |
| 5,992,698 A | 11/1999 | Copeland et al. |
| 5,993,183 A | 11/1999 | Laskaris et al. |
| 5,993,518 A | 11/1999 | Tateyama |
| 5,995,788 A | 11/1999 | Baek |
| 6,007,631 A | 12/1999 | Prentice et al. |
| 6,017,392 A | 1/2000 | Cavallaro |
| 6,025,689 A | 2/2000 | Prentice et al. |
| 6,068,202 A | 5/2000 | Hynes et al. |
| 6,082,289 A | 7/2000 | Cavallaro |
| 6,085,943 A | 7/2000 | Cavallaro et al. |
| 6,093,251 A | 7/2000 | Carr et al. |
| 6,112,588 A | 9/2000 | Cavallaro et al. |
| 6,119,895 A | 9/2000 | Fugere et al. |
| 6,126,039 A | 10/2000 | Cline et al. |
| 6,157,157 A | 12/2000 | Prentice et al. |
| 6,193,783 B1 | 2/2001 | Sakamoto et al. |
| 6,196,521 B1 | 3/2001 | Hynes et al. |
| 6,199,566 B1 | 3/2001 | Gazewood |
| 6,206,964 B1 | 3/2001 | Purcell et al. |
| 6,207,220 B1 | 3/2001 | Doyle et al. |
| 6,214,117 B1 | 4/2001 | Prentice et al. |
| 6,216,917 B1 | 4/2001 | Crouch |
| 6,224,671 B1 | 5/2001 | Cavallaro |
| 6,224,675 B1 | 5/2001 | Prentice et al. |
| 6,234,358 B1 | 5/2001 | Romine et al. |
| 6,253,957 B1 | 7/2001 | Messerly et al. |
| 6,253,972 B1 | 7/2001 | DeVito et al. |
| 6,257,444 B1 | 7/2001 | Everett |
| 6,258,165 B1 | 7/2001 | Cavallaro |
| 6,322,854 B1 | 11/2001 | Purcell et al. |
| 6,324,973 B2 | 12/2001 | Rossmeisl et al. |
| 6,354,471 B2 | 3/2002 | Fujii |
| 6,371,339 B1 | 4/2002 | White et al. |
| 6,378,737 B1 | 4/2002 | Cavallaro et al. |
| 6,383,292 B1 | 5/2002 | Brand et al. |
| 6,386,396 B1 | 5/2002 | Strecker |
| 6,391,378 B1 | 5/2002 | Carr et al. |
| 6,395,334 B1 | 5/2002 | Prentice et al. |
| 6,412,328 B1 | 7/2002 | Cavallaro et al. |
| 6,428,852 B1 | 8/2002 | Pillion et al. |
| 6,453,810 B1 | 9/2002 | Rossmeisl et al. |
| 6,511,301 B1 | 1/2003 | Fugere |
| 6,514,569 B1 | 2/2003 | Crouch |
| 6,540,832 B2 | 4/2003 | Cavallaro |
| 6,541,063 B1 | 4/2003 | Prentice et al. |
| 6,562,406 B1 | 5/2003 | Chikahisa et al. |
| 6,619,198 B2 | 9/2003 | Rossmeisl et al. |
| 6,626,097 B2 | 9/2003 | Rossmeisl et al. |
| 6,719,174 B1 | 4/2004 | Swift |
| 6,736,900 B2 | 5/2004 | Isogai et al. |
| 6,739,483 B2 | 5/2004 | White et al. |
| 6,851,923 B1 | 2/2005 | Fugere |
| 6,892,959 B1 | 5/2005 | Fugere |
| 6,957,783 B1 | 10/2005 | Fugere |
| 6,983,867 B1 | 1/2006 | Fugere |
| 7,000,853 B2 | 2/2006 | Fugere |
| 7,178,745 B1 | 2/2007 | Fugere |
| 7,331,482 B1 | 2/2008 | Fugere |
| RE40,539 E | 10/2008 | Fugere |
| 7,448,857 B1 | 11/2008 | Fugere |
| 7,694,857 B1 | 4/2010 | Fugere |
| 7,762,480 B1 | 7/2010 | Fugere |
| 7,905,945 B1 | 3/2011 | Fugere |
| 8,056,833 B1 | 11/2011 | Fugere |
| 8,197,582 B1 | 6/2012 | Fugere |
| 8,220,669 B1 | 7/2012 | Fugere |
| 2002/0007227 A1 | 1/2002 | Prentice et al. |
| 2002/0020350 A1 | 2/2002 | Prentice et al. |
| 2003/0000462 A1 | 1/2003 | Prentice et al. |
| 2003/0066546 A1 | 4/2003 | Bibeault et al. |
| 2003/0084845 A1 | 5/2003 | Prentice et al. |
| 2003/0091727 A1 | 5/2003 | Prentice et al. |
| 2003/0132243 A1 | 7/2003 | Engel |
| 2004/0089228 A1 | 5/2004 | Prentice et al. |

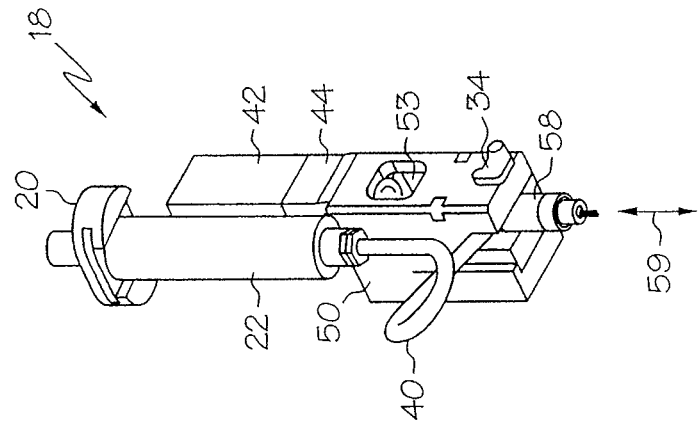
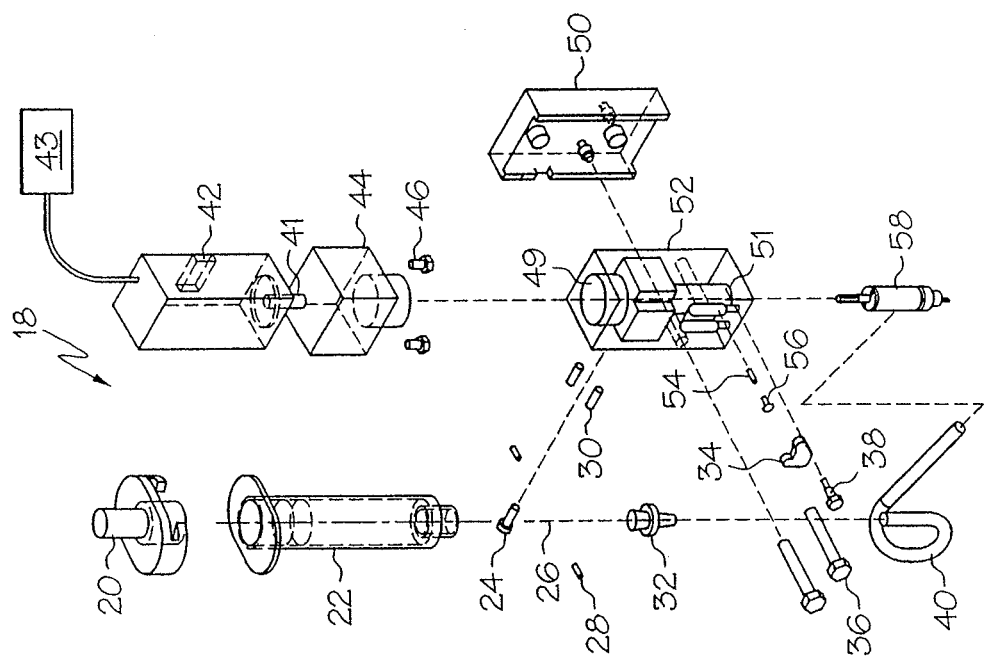

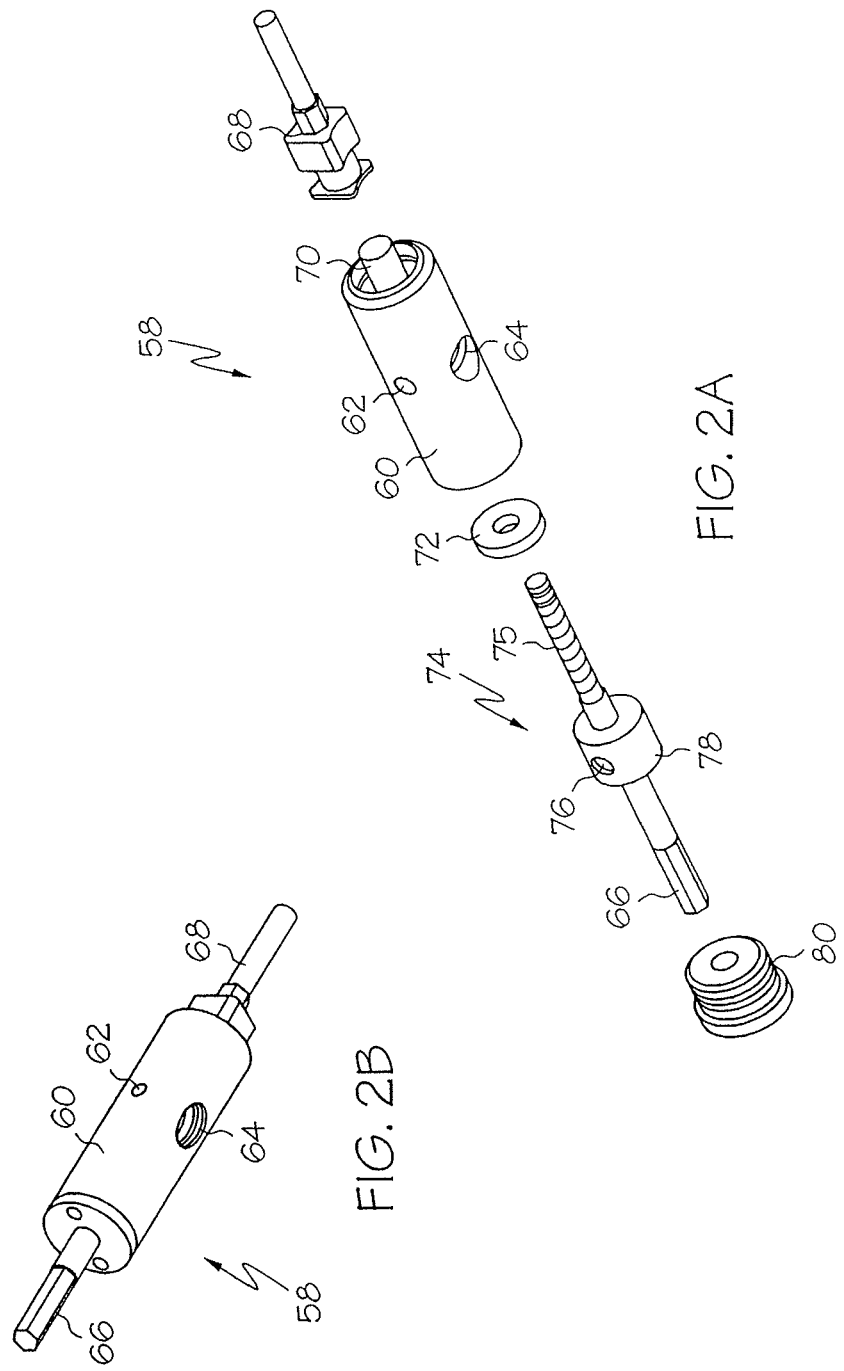

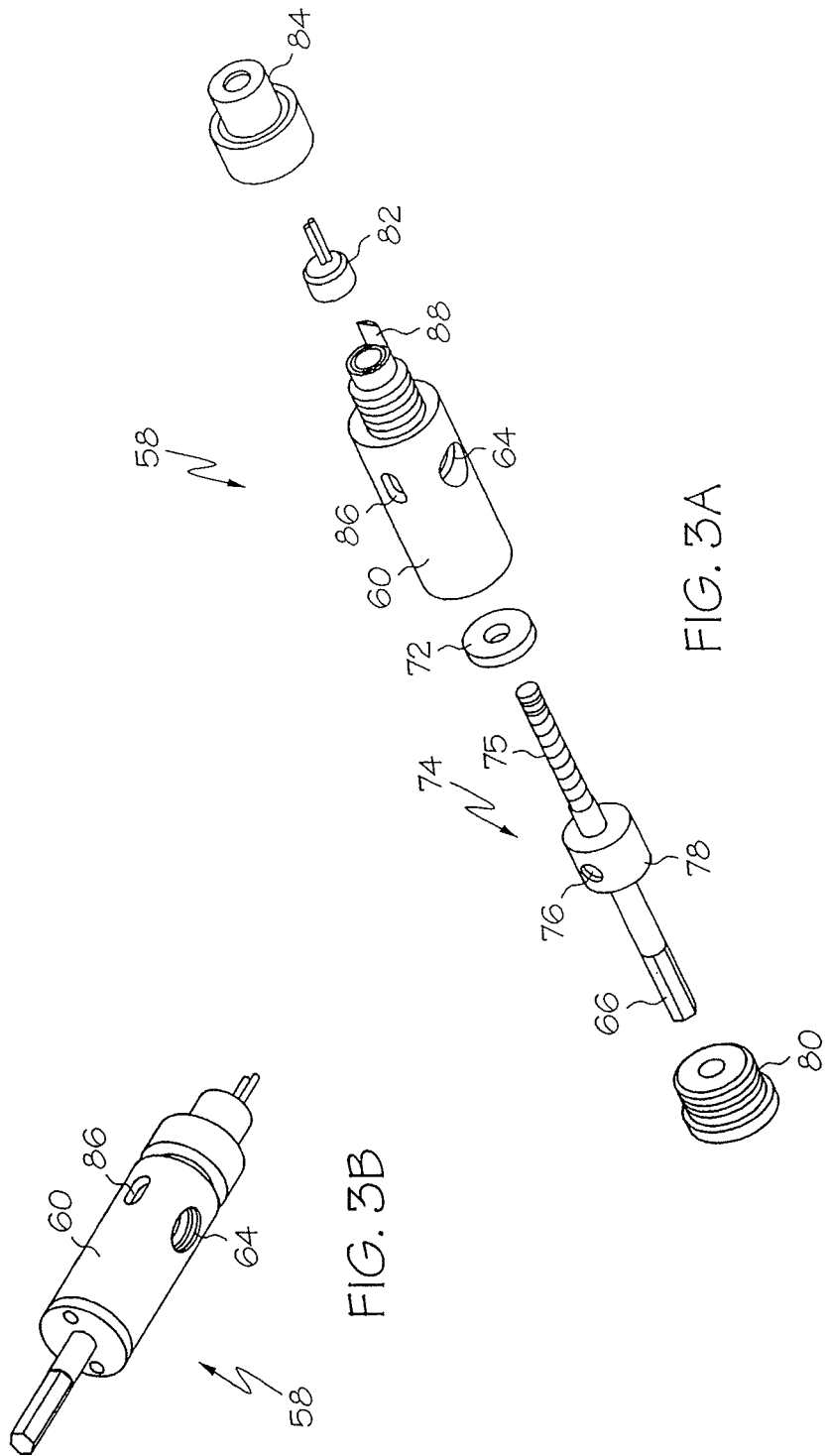

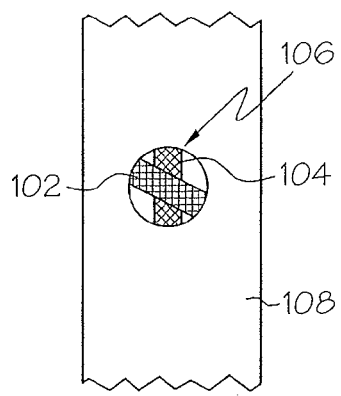 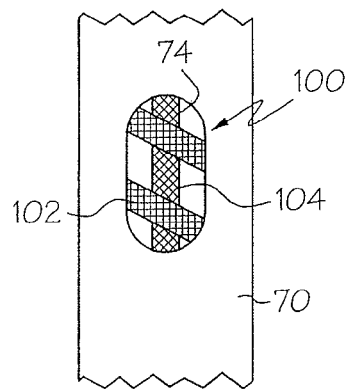 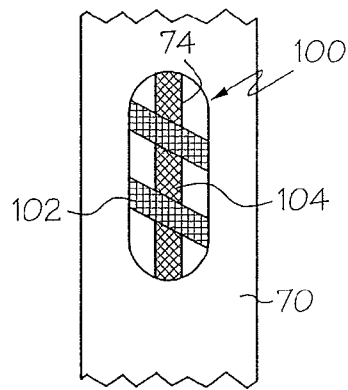
FIG. 4A     FIG. 4B     FIG. 4C
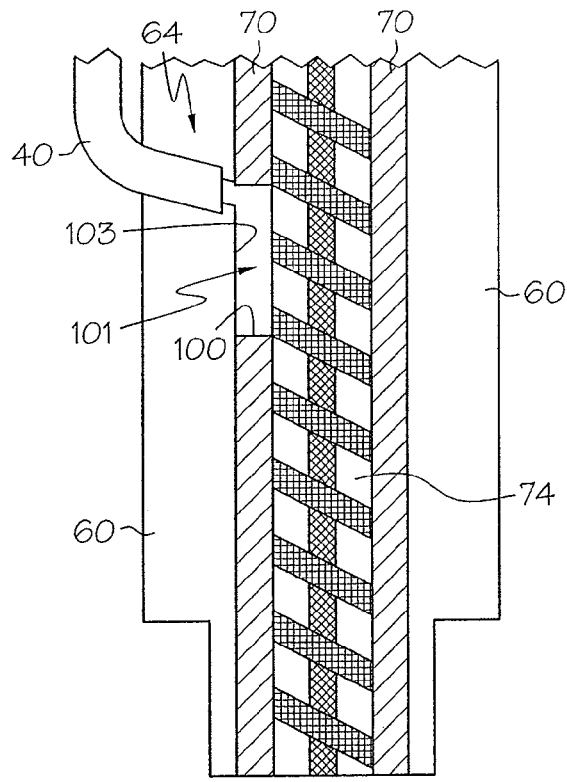 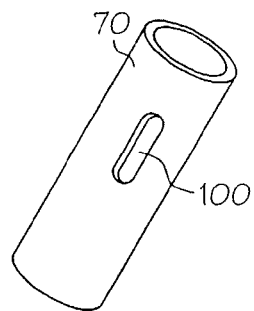
FIG. 5A     FIG. 5B

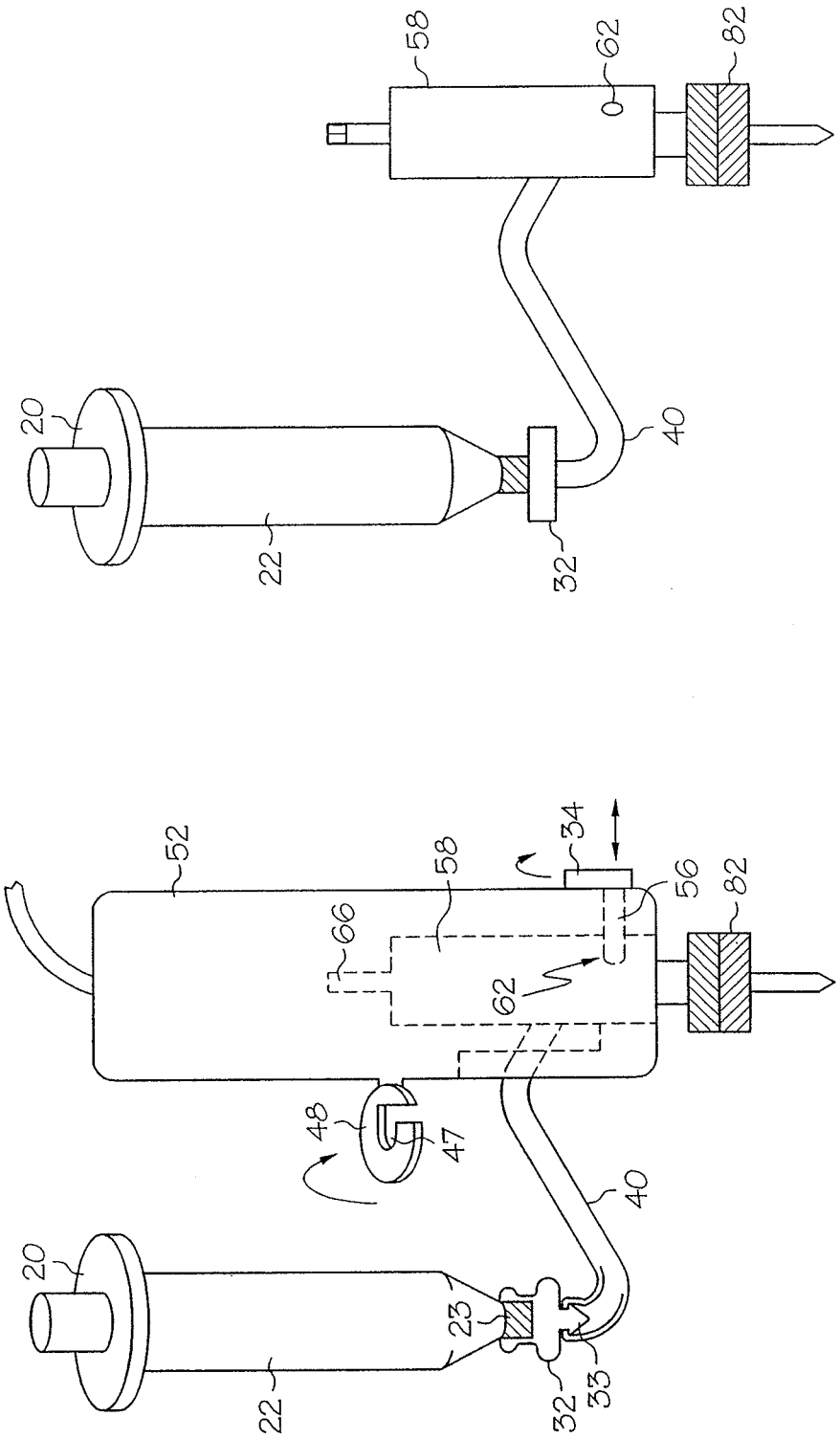

FLUID DISPENSE PUMP WITH DRIP PREVENTION MECHANISM AND METHOD FOR CONTROLLING SAME

RELATED APPLICATIONS

This application is a continuation application of U.S. Ser. No. 12/715,805, filed Mar. 2, 2010, now U.S. Pat. No. 7,694,857, which is a continuation application of U.S. Ser. No. 11/328,328, filed Jan. 9, 2006, which is a continuation application of U.S. Ser. No. 10/424,273, filed Apr. 28, 2003, now U.S. Pat. No. 6,983,867, which claims the benefit of U.S. Provisional Patent Application No. 60/376,536, filed Apr. 29, 2002, and is related to U.S. patent application Ser. No. 10/054,084, filed Jan. 22, 2002, now U.S. Pat. No. 6,892,959, U.S. patent application Ser. No. 10/038,381, filed Jan. 4, 2002, now U.S. Pat. No. 6,957,783, U.S. patent application Ser. No. 09/702,522, filed Oct. 31, 2000, now U.S. Pat. No. 6,511,301 and U.S. patent application Ser. No. 09/491,615, filed Jan. 26, 2000, now U.S. Pat. No. 6,547,167, the contents of each being incorporated herein by reference, in their entirety.

BACKGROUND OF THE INVENTION

Contemporary fluid dispense systems are well suited for dispensing precise amounts of fluid at precise positions on a substrate. A pump transports the fluid to a dispense tip, also referred to as a "pin" or "needle", which is positioned over the substrate by a micropositioner, thereby providing patterns of fluid on the substrate as needed. As an example application, fluid delivery systems can be utilized for depositing precise volumes of adhesives, for example, glue, resin, or paste, during a circuit board assembly process, in the form of dots for high-speed applications, or in the form of lines for providing underfill or encapsulation.

Early dispensing pumps included a syringe with a dispense tip and a pressured air/vacuum source. Air pressure was applied to a plunger in the syringe, causing the plunger to engage a fluid in the syringe, thereby initiating a dispensing operation by forcing the fluid out of the dispense tip. To halt operation, a vacuum was drawn on the plunger. In this manner, dispensing operations were controlled by regulating the air pressure/vacuum applied to the syringe. While this embodiment was adequate for certain applications, as technology evolved to demanded higher dispensing accuracy, its application became somewhat limited.

Contemporary dispensing pumps improved capability by increasing control over the timing and volume of the dispensing operation. This was accomplished through the integration of the feed screw into the dispensing pump system. Such systems comprise a syringe, a feed tube, a dispense cartridge, and pump drive mechanism. The syringe contains fluid for dispensing, and has an opening at its distal end at which a feed tube is connected. The feed tube is a flexible, hollow tube for delivering the fluid to the cartridge. The cartridge is hollow and cylindrical and includes an inlet neck at which the opposite end of the feed tube is connected. The inlet neck directs the fluid into the hollow, central cartridge chamber.

A feed screw disposed longitudinally through the center of the cylindrical chamber transports the fluid in Archimedes principle fashion from the inlet to a dispensing needle attached to the chamber outlet. A continuously-running motor drives the feed screw via a rotary clutch, which is selectively actuated to engage the feed screw and thereby effect dispensing. A bellows linkage between the motor and cartridge allows for flexibility in system alignment.

Pump systems can be characterized generally as "fixed-z" or "floating-z" (floating-z is also referred to as "compliant-z"). Fixed-z systems are adapted for applications that do not require contact between the dispense tip and the substrate during dispensing. In fixed-z applications, the dispense tip is positioned and suspended above the substrate by a predetermined distance, and the fluid is dropped onto the substrate from above. In floating-z applications, the tip is provided with a standoff, or "foot", designed to contact the substrate as fluid is delivered by the pump through the tip. Such floating-z systems allow for tip travel, relative to the pump body, such that the entire weight of the pump does not bear down on the substrate.

Such conventional pump systems suffer from several limitations. The motor and rotary clutch mechanisms are bulky and heavy, and are therefore limited in application for modern dispensing applications requiring increasingly precise, efficient, and fast operation. The excessive weight limits use for those applications that require contact of the pump with the substrate, and limits system speed and accuracy, attributed to the high g-forces required for quick movement of the system. The mechanical clutch is difficult to control, and coasts to a stop when disengaged, resulting in deposit of excess fluid. Clutch coasting can be mitigated by a longitudinal spring mounted about the body of the feed screw and urged against the chamber end to offer rotational resistance. However, the spring adds to the length of the cartridge, and contributes to system complexity.

The inlet neck feeds directly into the side of the feed screw or "auger". Consequently, as the auger collects material from the small and circular inlet port, high pressure is required for driving the material into the auger body, because the auger threads periodically pass in front of the feed opening, preventing material from entering. This leads to inconsistent material flow. Additionally, the inlet neck is commonly perpendicular to the auger screw, requiring the fluid to make a 90 degree turn upon entering the pump. This further limits material flow and can contribute to material "balling" and clogging.

Overnight storage of dispensed fluids often requires refrigeration of the fluid and cleaning of the system. The syringe is typically mounted directly to a mounting bracket on the pump body such that the output port of the syringe passes through an aperture on the mounting bracket. The feed tube is then coupled to the output port on the opposite face of the bracket. Since the tube and bracket are on opposite sides of the bracket, removal of the syringe from the pump body requires dismantling of the tube and syringe, which can contaminate fluid material positioned at the interface during disassembly. Further, since the syringe and cartridge can not be removed and stored together as a unit, disassembly and cleaning of the cartridge is required. Additionally, the inlet neck is narrow and therefore difficult to clean.

Dispense pumps are commonly mounted on a positioning platform, or gantry system, that positions the pump along the Cartesian x, y and z axes, relative to the substrate. A computer, or controller, performs various dispensing tasks using the positioning platform to control the pump position according to commands that are programmed by an operator. As explained above, pump/platform systems currently in use in the field employ the aforementioned brush motor or clutch-based pumps. Such pumps operate in response to a time-period-based signal from the controller, the duration of which dictates the length of time the motor is on (or, for a continuously-running motor system, the length of time the clutch is engaged), and therefore the amount of fluid that is dispensed. For example, the rising edge of the signal may initiate rotation of the brush motor (or engage the clutch), and the falling edge may turn off the motor (or disengage the clutch). While such pumps are adequate for operations requiring relatively large dispensing volumes, at smaller volumes the system resolution is relatively limited, since the timing signal is relatively inaccurate at shorter time periods, and since residual motion in the clutch or brush motor is difficult to predict. Assuming the platform/pump controller to be a computer-based system, the time-period-based signal may be subject to even further variability, since initiation of the signal may be delayed while other tasks are processed by the computer.

Conventional dispensing pumps are further limited in that following a dispensing operation, or in between dispensing operations, material can continue to flow, or drip, from the pump and dispense tip. This can lead to excessive dispensing of the fluid, for example in the form of greater dispensed fluid volume than desired, or the dripping of fluid at undesired locations on the substrate. This is especially problematic for dispensing of materials of relatively low viscosity, which tend to flow or drip more freely.

Others have attempted to address this problem, with limited success. For example, U.S. Pat. No. 5,819,983 proposes a pump embodiment having a auger screw that is axially moveable between a flow position, in which material is permitted to flow through the outlet, and a sealed position, in which material is prevented from flowing. A pneumatic system is used to drive the screw downward and upward between the flow position and the sealed position. This system is however mechanically complex, owing to the number of moving parts, and can cause eventual wear on the inlet of the dispensing needle, where the auger screw comes in contact with the needle when in a sealed position. In addition, the vertical position of the auger must be set, which can further complicate setup and maintenance of the system. Wear and improper settings can lead to inaccurate volume dispensing, and mechanical complexity can lead to jamming.

SUMMARY OF THE INVENTION

The present invention is directed to a fluid pump and cartridge system that overcomes the limitations of conventional systems set forth above, by providing a pump that includes a drip prevention mechanism and a method of operating the same that mitigate or prevent undesired release of the dispensed fluid. In one example, the fluid path is sealed. Positive pressure is applied to the fluid during a dispensing operation to present the fluid to the auger-style pump at a desired rate. Between dispensing operations, or when dispensing is completed, the fluid is placed in suspension, for example by applying a negative pressure, thereby preventing the fluid from being inadvertently released at the dispense tip. In addition, following a dispensing operation, the pump dispensing controller can be programmed to reverse the rotation of the feed screw, in order to draw the material in a reverse direction and to thereby further suspend the fluid.

In one embodiment, the present invention is directed to a material dispensing pump comprising a feed screw including a helical feed path defined between a major diameter and a minor diameter of the feed screw; the feed screw being driven in a first direction of rotation during a dispensing operation of material to be dispensed. A feed screw housing includes a cavity, the feed screw extending through the cavity. The feed screw housing further includes an inlet port and an outlet port in communication with the cavity, the helical feed path being substantially sealed from ambient air between the inlet port and the outlet port. A pressure unit applies positive pressure to cause material to be presented to the inlet port at a desired rate during a dispensing operation such that the material flows through the helical feed path toward the outlet port. A material suspension unit places the material in suspension following the dispensing operation.

In one embodiment, the material suspension unit applies negative pressure to the material to place the material in suspension. In another embodiment, the material suspension unit comprises means for constricting the material flow path, such as rollers or pinchers.

A material reservoir is in communication with the inlet port, the material reservoir containing the material to be dispensed during the dispensing operation. A feed tube is coupled between the material reservoir and the inlet port. The feed tube may be formed of an elastically compressible material and means may be provided for constricting the feed tube to place the material under suspension.

The material reservoir, in one embodiment, comprises a syringe, in which case, the positive pressure is applied to a plunger of the syringe. The positive pressure may comprise pumped air provided by the pressure unit and applied to the plunger, and the negative pressure may comprise a vacuum provided by the pressure unit and drawn on the plunger.

A motor may be coupled to the feed screw for driving the feed screw in the first direction of rotation during a dispensing operation. The motor further drives the feed screw in a second direction of rotation opposite the first direction following the dispensing operation. The movement of the screw in the second direction operates in conjunction with the negative pressure to suspend the flow of material. The motor may comprise a closed-loop servo-motor.

The feed screw includes a cylindrical neck, in which case the seal comprises an O-ring about the neck between the neck and the feed screw housing. The feed screw has a longitudinal axis, and the inlet port is elongated in a direction along the longitudinal axis of the feed screw.

In another embodiment, the present invention is directed to a method for dispensing material. During a dispensing operation of material to be dispensed, a feed screw including a helical feed path is driven in a first direction of rotation, the feed screw being disposed in a cavity of a feed screw housing such that the helical feed path is substantially sealed from ambient air. Positive pressure is applied to the material to cause material to be presented to the helical feed path at a desired rate. Following the dispensing operation, the material is placed under suspension.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1A and 1B are an exploded perspective view and an assembled perspective view respectively of a pump assembly configured in accordance with the present invention.

FIGS. 2A and 2B are an exploded perspective view and an assembled perspective view respectively of a fixed-z-type cartridge assembly in accordance with the present invention.

FIGS. 3A and 3B are an exploded perspective view and an assembled perspective view respectively of a floating-z-type cartridge assembly in accordance with the present invention FIGS. 4A, 4B and 4C are side views of a cartridge opening illustrating the conventional embodiment having a small, circular opening, and first and second embodiments of the present invention having elongated openings respectively.

FIG. 5A is a cutaway side view of a cartridge feed mechanism employing a carbide liner including an elongated slot at the inlet to allow for increased capturing of input material at the feed screw inlet, in order to promote consistency in material flow at a reduced pressure, in accordance with the present invention. FIG. 5B is a perspective view of the liner having an elongated slot, in accordance with the present invention.

FIGS. 6A and 6B illustrate operation of the syringe and cartridge quick release mechanisms, in accordance with the present invention.

DETAILED DESCRIPTION OF PREFERRED EMBODIMENTS

Figure 7A:
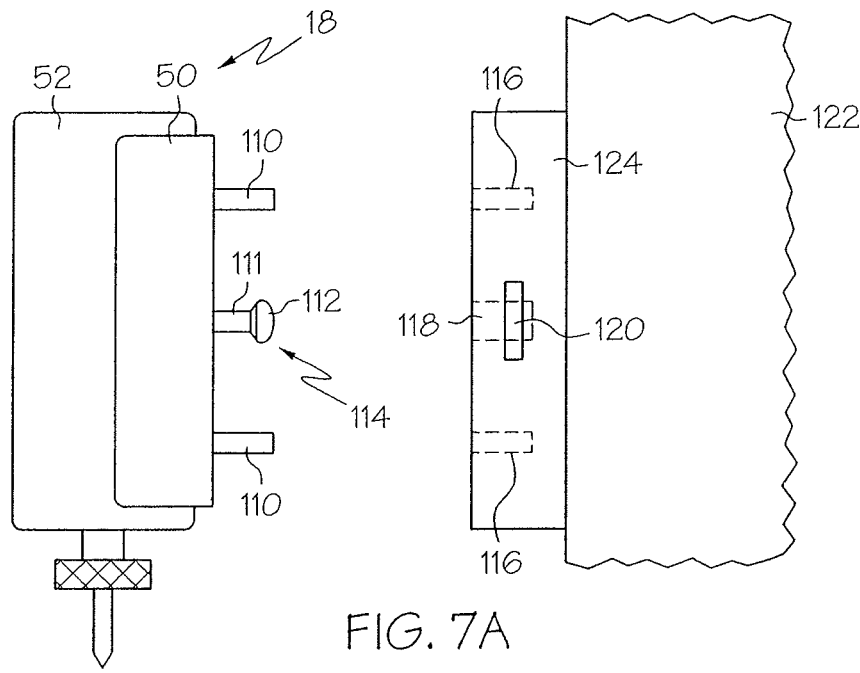
FIGS. 7A, 7B and 7C illustrate side, front, and top views respectively of a quick-release mounting plate, for mounting the pump to a pump dispensing frame, in accordance with the present invention.

FIGS. 1A and 1B are an exploded perspective view and an assembled perspective view respectively of a pump assembly configured in accordance with the present invention. With reference to FIGS. 1A and 1B, an embodiment of the dispensing pump 18 comprises a motor 42, an optional transmission box 44, a pump housing 52, and a cartridge 58.

The motor 42 preferably comprises a closed-loop servo motor with an independent motion controller 43. The motion controller 43 may be provided by the host dispensing platform, and may comprise, for example, a Delta Tau controller, Northbridge, Calif., USA. The closed-loop servo motor may comprise, for example, a Sigma Mini Series motor, produced by Yaskawa Electric Corp., Japan. Feedback is preferably provided by a rotary encoder, for example providing 8192 discrete counts over 360 degree rotation. The motor 42 includes an axle 41 which operates to drive the feed screw in the cartridge assembly 58 (described below). In this manner, high-performance control is maintained over material dispensing. For example, rotary position, rotational velocity, and acceleration/deceleration of the feed screw can be readily controlled by the closed-loop servo motor, and is easily programmed at the controller 43. This is compared to conventional embodiments that rely on timed open-loop coasting of a mechanical clutch for control over the feed screw. Additionally, the closed-loop servo-motor is generally a compact system that is small, lightweight, and designed for high-performance operation; as compared to the bulky, inefficient, and inaccurate conventional motor pump systems.

An optional planetary-gear transmission box 44 may be provided to step down the available motor positions, thereby providing even more enhanced control over angular position of the feed screw. For example, step-down transmissions offering 7:1, 25:1, and 48:1 step-down ratios are available for increasing the number of angular steps from 8,192 to 57,344, 204,800 and 393,216 respectively, depending on the application. Such transmission boxes are also available in compact units that match well in size and weight with the closed-loop servo motor 42.

The pump housing 52 comprises a machined or die-cast body having an opening 49 at a top portion for receiving the motor drive axle 41 or optional transmission box 44 drive axle (not shown). The interior of the housing 52 is hollow for receiving a cartridge 58 that extends through the housing 52 from an opening 51 at a bottom portion, upward to the top portion, and interfaces with the motor drive axle or transmission box drive axle. The motor 42 and transmission box 44 are mounted to each other, and to the housing 52, by bolts 46, and screws 24, 28, and 30. Cavities 53 are preferably provided in the walls of the housing 52, in order to reduce weight.

A cartridge release lever 34 is rotatably mounted to the housing 52 by bolt 38. When rotated, the cartridge release lever 34 engages an actuator pin 56, biased by spring 54 to remain in a released position. With reference to FIGS. 6A and 6B, the actuator pin 56 extends into the body of the housing 52 and engages an actuator pin capture 62 (see FIG. 2B) or elongated actuator pin capture (see FIG. 3B) formed in the cartridge body 60. In this manner the cartridge release lever is operable to remove/insert a cartridge 58 at the underside of the housing 52 as indicated by arrow 95 (see FIG. 1B).

A syringe 22 and feed tube 40 are releasibly coupled to a side wall of the housing, as shown. The syringe 22 includes a syringe holder 20, a syringe body 22, and a threaded outlet 23. An outlet adapter 32 mates with the thread 23 at an inlet end and with feed tube 40 at an outlet end. The feed tube 40 is preferably formed of a flexible material, a first end of which elastically deforms to fit over the outlet end of the syringe outlet adapter 32 to form a tight seal at neck region 33. The second end of the feed tube 40 inserts into a feed aperture 64 (see FIGS. 2B and 3B) formed in the cartridge body 60, or alternatively mates with a cartridge inlet port extending from the cartridge body 60.

With reference again to FIGS. 6A and 6B, the syringe 22 is likewise preferably configured to be readily separable from the pump housing 52, along with the cartridge 58. To accommodate this feature, a syringe quick-release arm 48 extends from a side wall of the pump housing 52, and includes a slot for snap-capturing the neck region 33 of the syringe outlet adapter 32. The quick release arm preferably elastically deforms to receive the neck 33, and to fix the syringe 22 in position during a dispensing operation. In this manner, the cartridge release lever 34 operates in conjunction with the syringe quick release arm to allow for easy removal and storage of the cartridge mechanism 58 and syringe 22 as a unit. This is especially helpful in situations where overnight refrigeration of the dispensing material is required, since the entire material pathway can be removed and stored as a unit, without the need for disassembly and cleaning of the individual components, as required by conventional pump configurations.

Figure 7B:
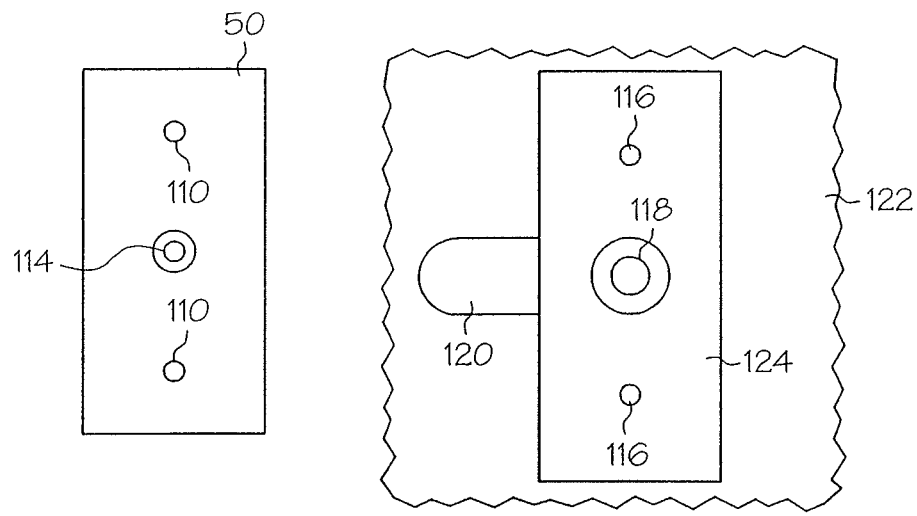
Figure 7C:
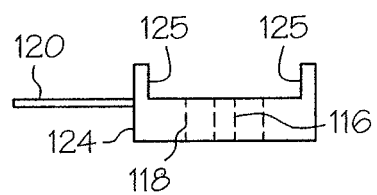

A release bracket 50 is mounted to a side wall of the housing 52. With reference to FIGS. 7A and 7B, the release bracket 50 includes first and second alignment pins 110 and a central lock pin 114, including a body 111 and retaining head 112, extending outwardly from its surface. A corresponding release bracket plate 124 is mounted to a dispensing frame 122, and includes alignment pin captures 116, a lock pin capture 118 and a spring-loaded lever 120. When operated, the lever, engages/disengages a clasp within the lock pin capture 118, that, in turn, clasps the retaining head 112 of the release bracket, when inserted and properly aligned with the plate 124. In this manner, the pump 18 can be readily attached/detached from the pump dispensing frame for maintenance and inspection. The alignment pins 110 and/or lock pin body 111 or retaining head 112 may optionally be keyed to ensure proper engagement. As shown in the top view of FIG. 7C, the release bracket plate 124 may optionally be configured with side walls 125 that communicate with the outer edge of the release bracket in order to provide a lateral keying function, thereby ensuring alignment accuracy and strength in cooperation with the alignment pins 110.

FIGS. 2A and 2B are an exploded perspective view and an assembled perspective view respectively of a fixed-z-type cartridge 58 assembly in accordance with the present invention. The cartridge assembly includes an elongated cartridge body 60, a first end of which is adapted to receive a fixed-z-type dispensing needle, for example Luer™-style needle 68. An opening at a second end of the cartridge receives an auger screw, or feed screw 74 having threads 75 at a first end, and having an indexed shaft 66 at an opposite end, adapted to register with the motor axle 41, or transmission axle. The auger screw 74 includes a collar 78, the height of which is adjustable by set screw 76. Washer 72 ensures a tight seal. A cap nut 80 contains the various cartridge components within the cartridge body 60. As explained above, an inlet port 64 is formed in the body 60 of the cartridge for receiving an end of the feed tube, for the delivery of material toward the feed screw threads 75. An actuator pin capture 62 engages the cartridge release pin 56, as described above. In the fixed-z embodiment of FIGS. 2A and 2B, the actuator pin capture 62 is the size of the release pin, to prevent longitudinal travel of the pump.

FIGS. 3A and 3B are an exploded perspective view and an assembled perspective view respectively of a floating-z-type cartridge 58 assembly in accordance with the present invention. In this embodiment, the feed screw mechanism is similar to that of FIGS. 2A and 2B; however, the cartridge is adapted for receiving a floating-z-type dispensing needle 82. The needle body 82 registers with locator 88 at the cartridge outlet, and is fixed in place by needle nut 84. For the floating-z-type cartridge assembly, an elongated actuator pin capture 86 is provided to allow for longitudinal travel of the cartridge 58 relative to the pump housing 52 during a dispensing operation.

FIG. 4A of a inlet port for a conventional cartridge 108 embodiment having a small, circular port opening 106. In this embodiment, it can be seen that the pressurized material entering the port opening 106 periodically confronts a major diameter of the feed screw thread 102, which periodically inhibits flow of material into the feed screw cavity formed between the minor diameter portion 104 of the thread and the interior wall of the cartridge body 108. As much as ⅓ to ½ of the port opening can be periodically blocked by the major diameter of the feed screw thread 102 at any given time. The blockage fluctuates as a function of the rotational position of the feed screw which can cause inconsistency in material dispensing, especially at small tolerances, and can further alter pressure in the syringe system, as the blockage restricts material flow. The blockage further increases the likelihood of material stagnation and drying at the inlet port, in turn causing system contamination.

The present invention overcomes this limitation by providing an elongated cartridge inlet port. With reference to FIGS. 4B and 4C, the elongated inlet port 100 of the present invention is preferably elongated in a longitudinal direction, with respect to the longitudinal axis of the feed screw 74. In this manner, dispensing material is presented to a larger portion of the feed screw cavity formed between the minor diameter portion 104 and the inner wall of the cartridge 70. This configuration reduces pressure requirements for material delivery through the system, and enhances consistency in material flow, as the dependency on material flow rate as a function of the feed screw thread position is mitigated or eliminated. In general, a longer inlet port as shown in FIG. 3 is preferred, as compared to the relatively shorter inlet port 100 shown in FIG. 4B; however, the inlet port 100 should not be so long as to provide an opportunity for pooling of dormant material in the inlet port 100 prior to flow through the feed screw 74.

FIG. 5A is a cutaway side view of a cartridge feed mechanism employing a carbide liner 70 including an elongated slot 100 at the inlet port to allow for increased capturing of input material at the feed screw inlet, in order to promote consistency in material flow at a reduced pressure, in accordance with the present invention. FIG. 5B. is a perspective view of the liner having an elongated slot, in accordance with the present invention.

In this embodiment, the elongated inlet port is provided by a slot 100 formed in a side wall of a cylindrical carbide liner 70 inserted in the cartridge body 60 about the feed screw 74. The cartridge inlet port 64 comprises a standard circular bore formed in the cartridge body 60, preferably at an acute angle relative to the feed screw 74, to allow gravity to assist in material flow. An elongated chamber, or pocket 101, is formed within the slot 100, between the feed screw 74 and the inner wall 103 of the cartridge body, in a region proximal to the inlet port 64. The elongated pocket 101 allows for dispensing fluid to migrate in a downward direction, and is captured by the feed screw threads over a larger surface area, conferring the various advantages outlined above.

Figure 8:
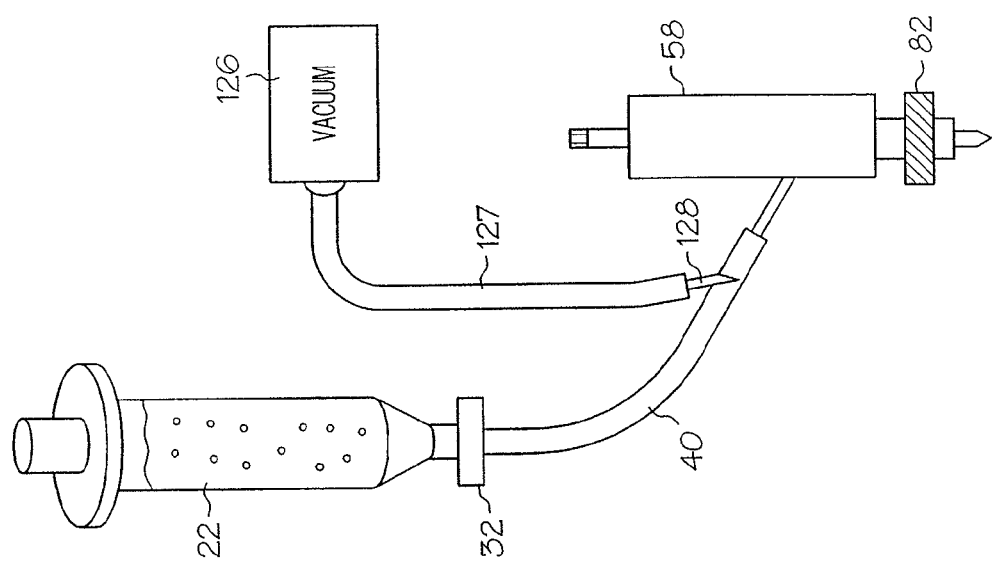
FIG. 8 is a illustration of an improved dispensing configuration employing a vacuum tube inserted into the material feed tube, in accordance with the present invention.

FIG. 8 is a illustration of an improved dispensing configuration employing a vacuum tube inserted into the material feed tube. In this embodiment, entrapped gas impurities, such as air microbubbles, are drawn from the material supply during a dispensing operation, thereby purging the system of entrapped air. A vacuum unit 126 draws a vacuum from the material supply tube 40, for example by a vacuum tube 127 with needle 128 inserted into the material feed tube 40, along the direction of material flow, as shown. In this manner, air is withdrawn from the dispensed material, leading to an improvement in dispensing consistency, especially at small tolerances.

Figure 9:
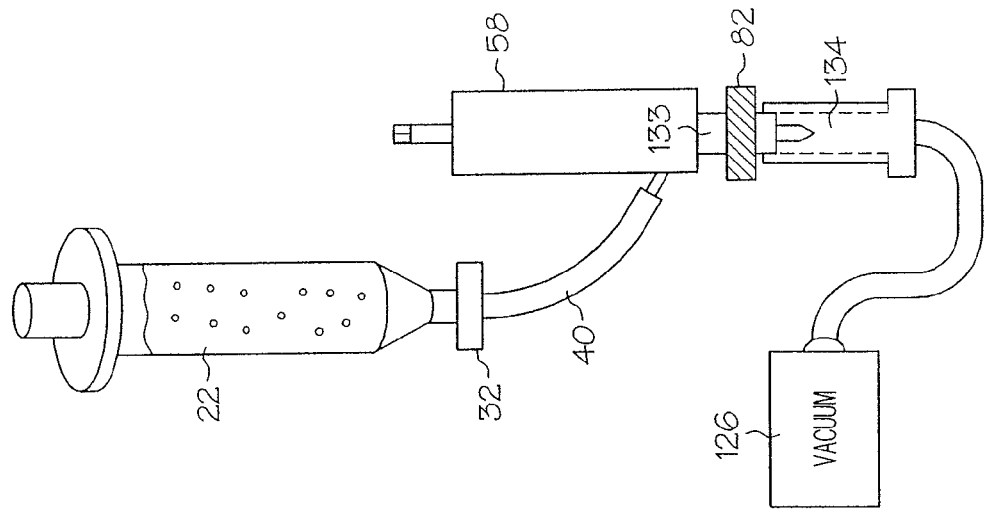
FIG. 9 is an illustration of an air purge configuration wherein a purge vacuum is applied to the needle assembly for initially purging the material flow of air pockets, to prime the system for dispensing, in accordance with the present invention.

FIG. 9 is an illustration of an air purge configuration wherein a purge vacuum is applied to the needle assembly for initially purging the material flow of air pockets, to prime the system for dispensing. In this process a first purge interface 134 is placed on the end of the feed tube, and a vacuum is drawn by vacuum unit 126, thereby purging the feed tube 40 of entrapped gas. A second purge interface 134 is then placed on the cartridge body outlet 133 while the feed screw is rotated slowly until material presents itself at the outlet 133. A vacuum is drawn by vacuum unit 126 to eliminate entrapped gas from the cartridge. A third purge interface 134 is then placed on the needle assembly 82 and a vacuum is drawn by vacuum unit 126 to eliminate entrapped air from the needle body. Entrapped air is thus substantially removed from the feed tube, auger screw and dispensing needle. Normal dispensing can commence following removal of the purge interface. Note that the first, second and third purge interfaces 134 may require different interface configurations for the different components undergoing purging.

Figure 10:
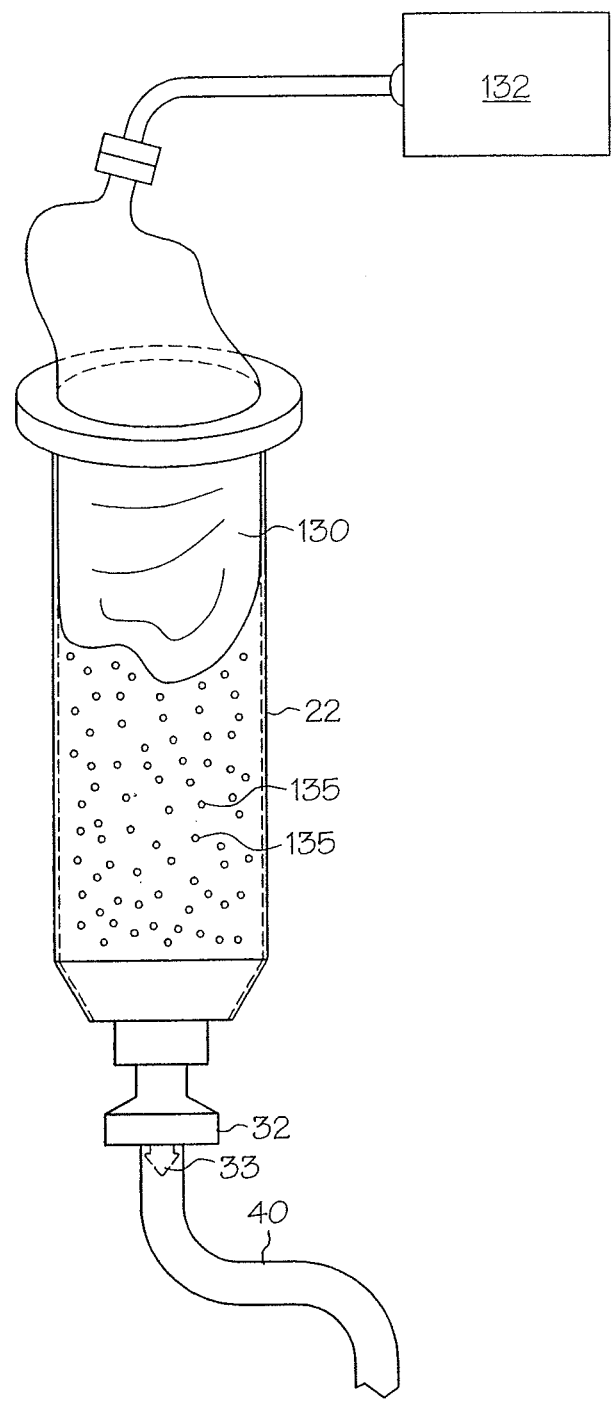
FIG. 10 is an illustration of a bellows configuration for application to the top of a material feed syringe, allowing for use of minimal pressure to drive material flow with mitigation or elimination of air migration into the material, in accordance with the present invention.

FIG. 10 is an illustration of a bellows configuration for application to the top of a material feed syringe, allowing for use of minimal pressure to drive material flow with mitigation or elimination of air migration into the material. In this configuration, a bellows means 130, for example comprising an air-tight, flexible material, is inserted at the piston end of, and replaces the piston of, a dispensing syringe 22. The bellows is pressurized by air pressure unit 132 from within and expands, thereby exerting pressure on the underlying material 135, forcing material flow through the outlet 32. In this manner, material can be driven with minimal pressure, and with minimal air migration into the material, as compared to plunger-style drivers. In a preferred embodiment, the bellows comprises a latex film applied about the lip of the syringe top. The flexible latex film serves to conform to the inner walls of the syringe during expansion, pushing the underlying material in a downward direction The syringe top is preferably vented to allow for expansion of the bellows.

In this manner a high-performance, lightweight pump configuration is provided. The pump is operable in both fixed-z and floating-z mode. Quick release mechanisms provide for storage of the syringe and cartridge as a single unit, without the need for component disassembly. The components themselves are relatively easy to clean and maintain. The elongated inlet port provides for enhanced dispensing consistency at a lower material pressure, while the various purging and priming techniques allow for removal of entrapped gases, further improving dispensing consistency.

The pump of the present invention is amenable to use with dispense tips configured in accordance with those described in U.S. patent application Ser. No. 09/491,615, filed Jan. 26, 2000, the contents of which are incorporated herein by reference, in their entirety.

Figure 11:
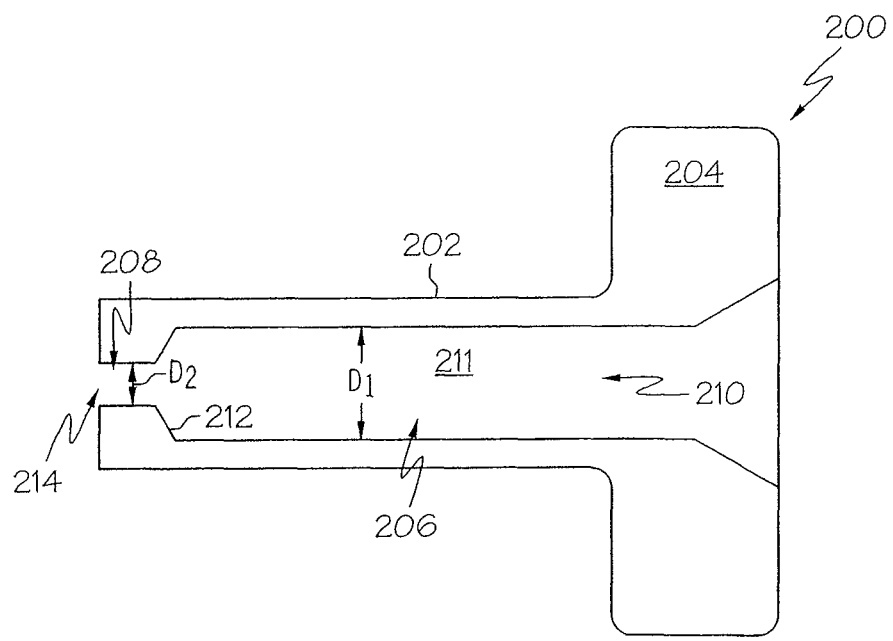
FIG. 11 is a cutaway side view of a dispense tip configuration in accordance with the present invention.

With reference to FIG. 11, such dispense tips 200 include a bore 210 formed in the neck 202 of the dispense tip 200, the bore 210 having an input end 211 of a first inner diameter D1, an output end 208 of a second inner diameter D2, and an inner taper 212 for transitioning the inner surface of the bore from the first inner diameter D1 to the second inner diameter D2. This dispense tip configuration allows for the delivery of fluid to the outlet 214 at a relatively low pressure as compared to conventional dispense tips having a single, narrow, inner diameter over the length of the neck. The wider diameter D1 along the majority of the neck 202 allows for delivery of fluid to the narrow diameter D2 opening at a relatively low pressure that is more desirable for volume control, while the relatively small opening 214 at the output end 208 allows for control over the volume of the dispensed fluid on the substrate.

In particular, the pump of the present invention is amenable to operation with dispense tips having a vented outlet face, as illustrated in FIGS. 12-15. Such vented dispense tips are beneficial in applications where a pattern of dispensed fluid, such as an "X", or a star-shaped pattern, is desired. Such applications include providing a fillet on a substrate for adhering a circuit die to the substrate. As the area of circuit dies continues to decrease, there is an increasing need for accurate dispensing of fillet patterns. An accurate and consistent dispense of the fillet pattern requires a predictable volume of dispensed fluid, as well as a precise pattern shape. For example, it is desirable that the legs of the X-pattern do not merge into one another due to migration of fluid between the vents.

Figure 12A:
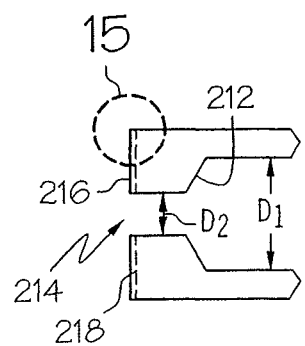
FIGS. 12A and 12B are side and end views respectively of the dispense tip of FIG. 11 having a vented outlet, in accordance with the present invention.
Figure 12B:
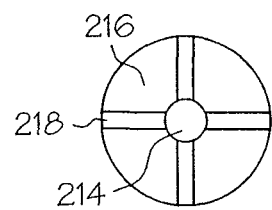

With reference to the cutaway side view of FIG. 12A and the output end view of FIG. 12B, in one embodiment, the vented dispense tip, configured in accordance with FIG. 11, includes vents 216 (in this example, four vents, but other numbers of vents are possible) that extend radially from the outlet 214 at the output end. The outer face 216 of the output end is flat and has a diameter equal to that of the outer diameter of the neck of the dispense tip.

Figure 13A:
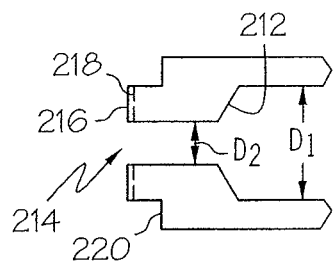
FIGS. 13A and 13B are side and end views respectively of the dispense tip of FIG. 11 having a vented and relieved outlet, in accordance with the present invention.
Figure 13B:
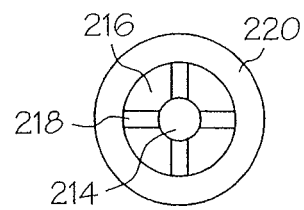

In the example of FIGS. 13A and 13B, the vented dispense tip, configured in accordance with FIG. 11, includes vents 218 that extend radially from the outlet 214 of the output end. The outer face 216 of the output end is flat and has a diameter that is less than that of the outer diameter of the neck of the dispense tip, as a circular relief 220 is formed about the outer face 216. The relief 220 is advantageous for those applications that require presentation of the dispensed pattern at a position close to an edge of a feature, or within a pocket on the substrate, since, owing to the relief 220, the center of the outlet 214 can be positioned closer to the edge of the feature for a deposit of fluid.

Figure 14A:
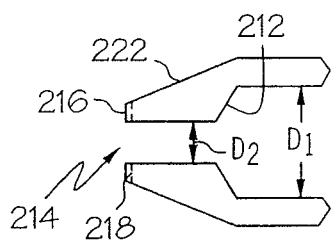
FIGS. 14A and 14B are side and end views respectively of the dispense tip of FIG. 11 having a vented and beveled outlet, in accordance with the present invention.
Figure 14B:
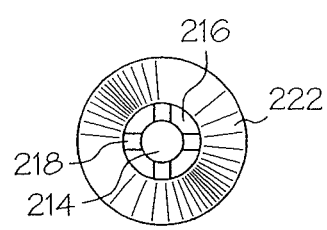

In the example of FIGS. 14A and 14B, the vented dispense tip, configured in accordance with FIG. 11, includes vents 218 that extend radially from the outlet 214 of the output end 208. The outer face 216 of the output end is flat and has a diameter that is less than that of the outer diameter of the neck of the dispense tip. A bevel 222 is formed about the outer face 216. In one example, the bevel can be formed according to the techniques described in U.S. patent application Ser. No. 09/491,615, filed Jan. 26, 2000, the contents of which are incorporated herein by reference above. The bevel reduces surface tension between the deposited fluid and the dispense tip, leading to more consistent and predictable deposit on the substrate. In an embodiment where the dispense tip bevel 222 is ground in a longitudinal direction, i.e. in a direction parallel to the longitudinal axis of the neck, the resulting tooling scars are longitudinal, and surface tension during a deposit is reduced even further, as described in the referenced patent application.

Figure 15:
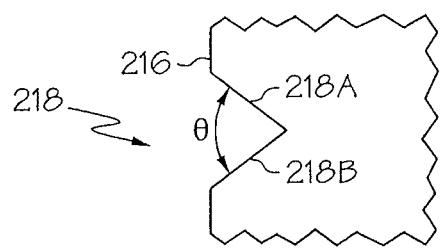
FIG. 15 is a closeup end view of an outlet vent, in accordance with the present invention.

With reference to the closeup view of FIG. 15, which illustrates an endwise view of a preferred embodiment of the dispense tip vent 218, the vent 218 preferably includes first and second angled faces 218A, 218B that are disposed at a vent angle $\theta$ with respect to each other. Deeper vent pockets tend to leave material on the dispense tip following a deposit, since the surface tension is increased owing to the increase surface area of the pocket. Rectangular, three-faced pockets having two side walls and a ceiling suffer from this limitation. A preferred embodiment of the present invention therefore incorporates vents that have two inner walls disposed at a vent angle $\theta$ to one another, as shown in FIG. 15. In one example, a 100 degree vent angle $\theta$ was found suitable for permitting adequate material flow through the vent, while minimizing surface tension at the outlet face 216. Other angles may be appropriate, for example between a range of 45 and 135 degrees; the selected angle depending on various characteristics of the deposit process, including flow rate, material type, volume, and other considerations.

In a preferred embodiment, the outlet face 216, including the vents 218 can be provided with a nutmeg-chrome finish, which provides a nickel/Teflon™ plating on the outer surface. Such a finish serves to further reduce surface tension at the outlet face.

In the closed-loop servo motor pump configuration of the present invention, auger rotation is controlled over its entire motion, from initiation to completion of a dispensing operation. In view of this, the control system managing the operation of the auger rotation is in complete control of the angular velocity and angular acceleration of the auger as it rotates. By managing the velocity, the dispensing of fluid can be controlled to an exceptionally high degree, including not only volume, but also rate. This, in turn, allows for predictability in fluid migration through the vents of the vented dispense tip during a deposit.

For example, assuming the rate of deposit is too slow, the dispensed material will tend to flow through the path of least resistance. If one of the vents has lower material flow resistance than the others, this can lead to an imbalanced dispense pattern, with more fluid deposited in the less-resistant leg. However, with control over the velocity of the auger, as in the configuration of the present invention, the velocity can be increased, causing the material to flow down all legs at a consistent rate, leading to more reliable deposit pattern profiles.

In an embodiment where the vents 218 are machined in the outlet face of the dispense tip, the vents are preferably ground or formed to have tooling lines in a direction parallel to the long axis of the vents, in order to reduce surface tension. The configuration of the vent depends on the width and volume of the desired dispense pattern.

Using the vented dispense tips illustrated above, a range of dispense patterns can be created. For example, assuming the auger is caused to rotate slightly, a small dot can be formed on the substrate, since fluid migration up the vents does not take place. With further rotation of the auger, an X pattern can be formed having legs of a length less than the length of the vents, since fluid migration takes place for a portion of the vents. With even further rotation of the auger, the X pattern can be formed with longer legs that equal the length of the vents. In this manner, a single, vented dispense tip, in combination with the closed loop servo motor dispense pump of the present invention can provide a range of dispensing profiles while reducing the number of dispense tips required.

The outlet face 216 effectively serves as a foot for the dispense tip. In this manner, the vented dispense tip of the present invention is suitable for floating-z applications, wherein the outlet face comes in contact with the substrate during a dispensing operation. Alternatively, the vented dispense tip of the present invention is also applicable to fixed-z configurations.

Figure 16:
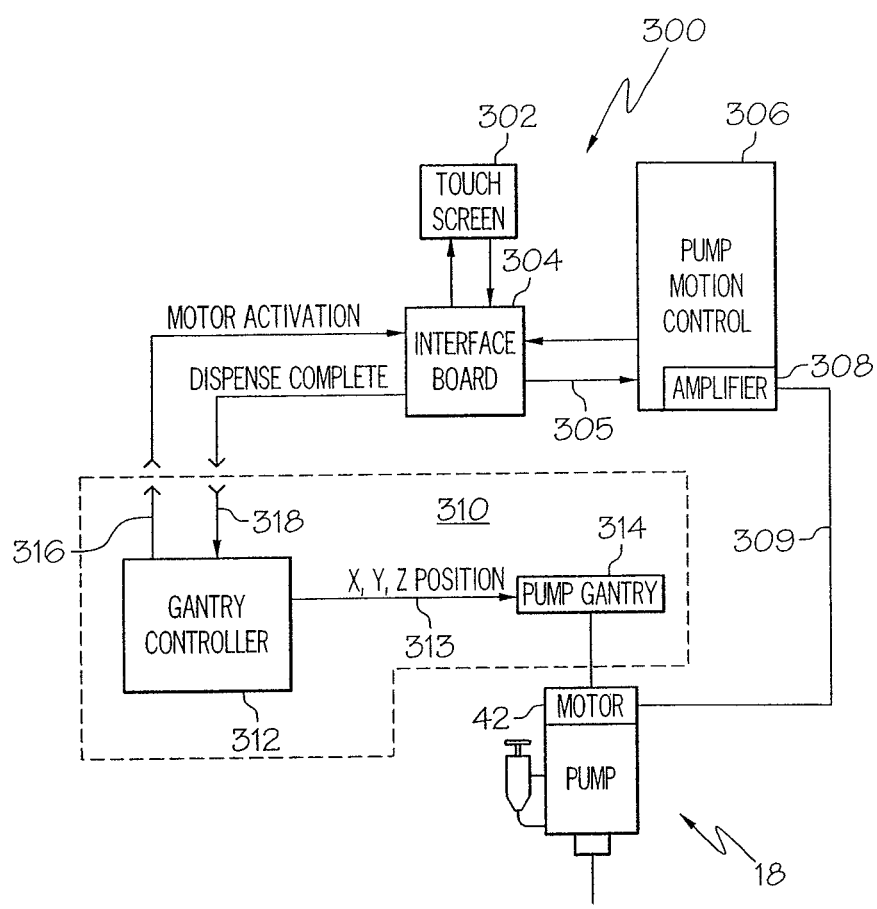
FIG. 16 is a block diagram of a control system for the pump of the present invention.

FIG. 16 is a block diagram of a control system which permits the dispensing pump of the present invention to be operated in conjunction with a conventional pump position controller. The control system includes a dispensing pump 18, a position controller 310, and a dispensing controller 300.

The pump 18 preferably comprises a dispensing pump driven by a closed-loop servo motor 42 having indexed rotational, or angular, positions, for driving an auger screw for delivery of fluid to the dispense tip. As explained above, the motor 42 preferably includes an encoder that provides for precise control over the angular positioning of the motor during operation. To accommodate this, the motor 42 receives control signals 309 from the dispensing controller 300. The control signals 309 may comprise, for example, digital signals for controlling the angular, or rotational, position, the angular velocity, and/or the angular acceleration of the motor 42.

The pump 18 is mounted to a conventional pump gantry 314 that operates in conjunction with a gantry controller 312 to comprise the position controller 310. The position controller 310 may comprise a conventional pump dispensing platform designed for use with a conventional brush motor or clutch-based pump. The present invention therefore allows for the inventive pump 18 described above to be compatible with the conventional position controllers 310, thereby allowing for reverse compatibility with conventional dispensing platforms, or gantry systems, currently in use in the field, but limited by the conventional brush-motor or clutch-based pumps, for which their use was designed.

In the conventional position controller 310 system, the gantry controller 312 is programmable and generates positioning signals 313 for moving the pump gantry 314 into position along Cartesian axes (x, y, z). Upon determining that the pump gantry 314 is in position for a dispensing operation, the gantry controller 312 generates a motor activation signal 316 comprising a rectangular waveform having a rising and falling edge, the time period between the edges dictating the length of time that the motor operates (or for a continuously-running motor, the length of time the clutch is engaged), and therefore the amount of fluid that is dispensed.

The pump 18 of the present invention however includes a more sophisticated, position-based motor that is based on an indexing, or count, signal protocol, rather than a time-based protocol. To accommodate this, the system of the present invention includes a dispensing controller 300 that generates a position-based pump control signal 309 for the motor 42 in response to the time-based motor activation signal 316 generated by the gantry controller 312 of the conventional position controller 310. In this manner, the dispensing controller 300 of the present invention allows for the pump 18 of the present invention to be used in conjunction with a conventional position controller 310.

As described above, during a pump operation, the position controller 310 positions the pump gantry 314 according to program coordinates along Cartesian axes 313. Upon determining that the pump gantry 314 is in position for dispensing operation, the gantry controller 312 initiates a motor activation signal 316. The motor activation signal 316 comprises a rectangular waveform that may be, for example, active-high or active-low. For purposes of the present invention an active-high signal will be assumed. The motor activation signal 316 is received by an interface board 304 which converts the rectangular waveform of the motor activation signal to a digital signal 305 that is consistent with the protocol for programming the pump motion control card 306, for example the Delta Tau controller referenced above. The controller 306 includes an amplifier 308 for driving the dispense signals 309 over a cable interface to the motor 42. The motor 42 receives the converted dispense signals 309 and responds by performing a dispensing operation in accordance with the signals 309. In general, dispensing operations can be categorized according to dot dispensing and line dispensing.

In a dot dispensing operation, the position controller 310 moves the pump gantry 314 to a fixed position and initiates a brief motor activation signal 316 having a short period designed to activate the conventional motor for a brief time period so as to dispense a single dot on the substrate. Since the pump gantry 314 is stationary during the dispensing operation, a dot is dispensed on the substrate, the volume of which depends on the period of the rectangular motor activation signal 316. The interface board 304 of the dispensing controller 300 interprets the rising edge of the motor activation signal 316 as an indication that the pump gantry 314 is in position and, in response, commences a dispensing operation. In a preferred embodiment, the dispensing controller 300 is programmed to be synchronized with the program of the position controller 310 such that both controllers 300, 310 are aware of the type of operation being performed, for example a dot, or line, dispensing operation. Assuming a dot dispensing operation, the dispensing controller 300 responds to the rising edge of the motor activation signal 316 by generating an dispense signal 309 that informs the motor 42 of the number of indexed rotational position counts that the motor is to traverse during the dispensing operation. The dispense signal 309 allows for optional further sophistication in control over the motor. For example, the dispense signal 309 may also include information related to the angular velocity and angular acceleration of the motor 42 during the dispensing operation. At completion of the dispensing operation, the interface board 304 of the dispensing controller 300 optionally generates a feedback signal 318 to indicate that the dispensing operation is complete. Certain position controllers 310 utilize such a feedback signal 318 to indicate that the dispensing operation is complete and that the gantry controller can now advance the pump gantry 314 to the next position for dispensing. Assuming the position controller 310 does not accommodate such a feedback signal, then the position controller 310 should allow for a sufficient time period to a lapse following a dispensing operation to ensure that the dispensing operation has been completed by the dispensing controller 300 before advancing to the next dispensing activity.

In a line dispensing operation, the dispensing controller 300 receives the leading edge of the motor activation signal 316 at the interface board 304 and instructs the pump motion control 306 via signal 305 to generate a dispense signal 309 that programs the motor 42 to activate, and hold at a constant angular rate, for a period of time that is consistent with the duration of the motor activation signal 316. During line dispensing, the pump gantry 314 is in motion while the pump motor 42 is dispensing. The combination of the motion of the pump gantry 314 and the rotation of the motor 42 results in line-patterns being generated on the substrate. At the falling edge of the motor activation signal 316, the dispensing controller 300 modifies the dispense signal 309 to halt the rotation of the motor 42, thereby completing the line dispensing operation. As explained above, the dispense signals 309 may further optionally vary the angular velocity and/or angular acceleration of the motor 42 during a line dispensing operation.

In a preferred embodiment, the dispensing controller 300 is programmable, for example via a touch screen interface 302, or a standard computer interface, for recording a plurality of dispensing operations in automated fashion in conjunction with the programmable position controller 310. The program may comprise a single, repetitive operation or multiple, programmable operations wherein the position, velocity, and acceleration of the motor 42 are programmable at each dot or line dispensing operation step. The user interface 302 may further allow for manual control over the dispense pump 18, or automatic control based on the motor activation signal 316 received from the position controller 310. The user interface further preferably allows for safe storage of programs and automatic retrieval of programs, for example according to program titles, or part numbers.

In preferred embodiments, the user interface further includes reverse mode control for operating the motor in reverse rotation, and a purge mode which allows for continuous rotation of the motor 42 in a forward direction for a length of time to be controlled by the user at the user interface 302, or optionally at the position controller 310.

In this manner, the dispensing controller 300 of the present invention allows for the advanced pump 18 of the present invention to be reverse-compatible with conventional position controllers 310.

Figure 17:
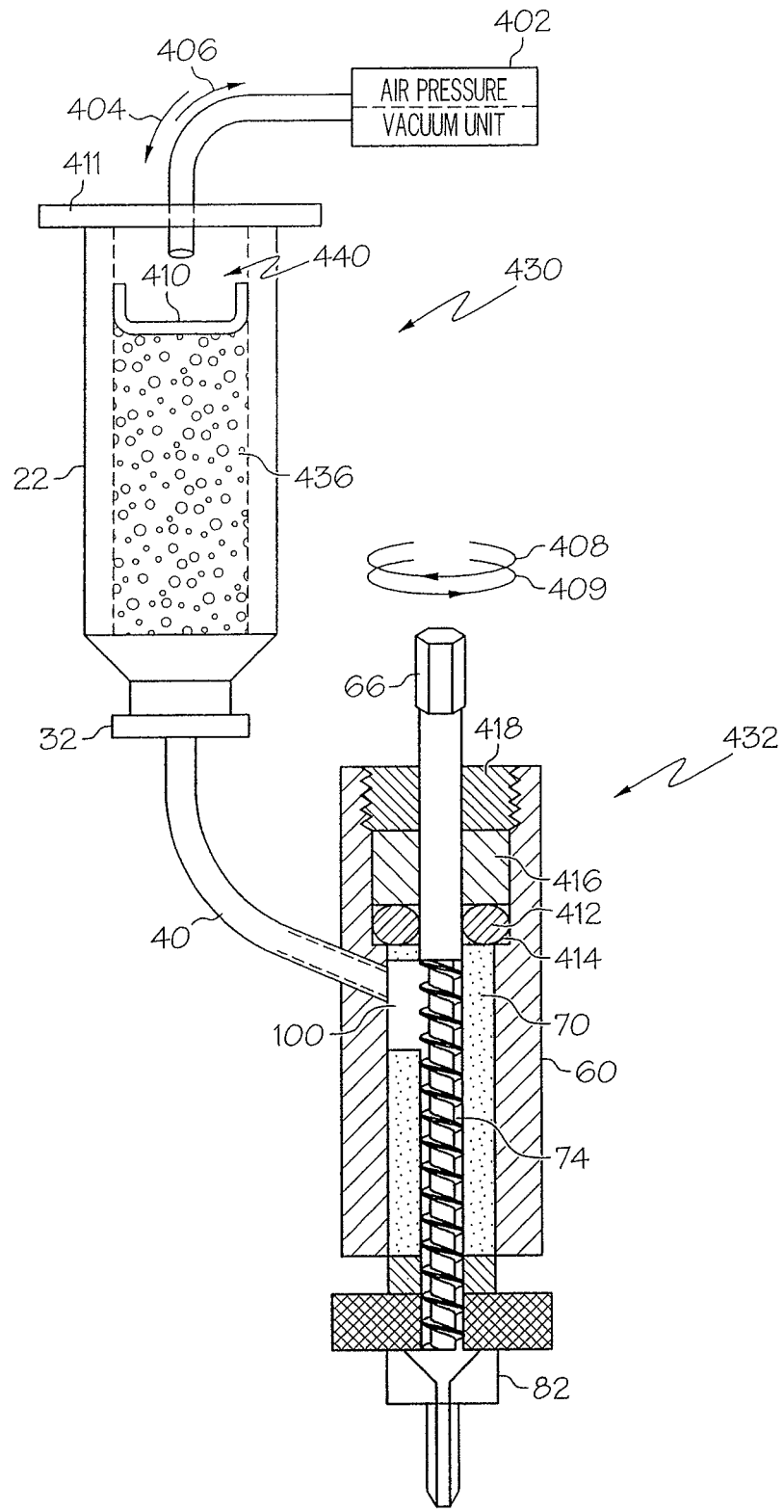
FIG. 17 is a cross-sectional view of a dispensing pump having drip prevention capability in accordance with the present invention.

FIG. 17 is a cutaway side view of a dispensing pump configuration in accordance with the present invention. In this configuration, the pump is provided with drip prevention capability in order to avoid over-dispensing of fluid at a given location, or to avoid dripping of fluid between dispensing operations at undesired locations.

The configuration of FIG. 17 includes a material dispensing container 430 or reservoir, for example in the form of a syringe, driven by an air pressure/vacuum unit 402, and a fluid dispensing pump 432. The pump 432 is of the auger-screw Archimedes-style pump described above. In the pump 432, the auger screw shaft 66 extends longitudinally through the body of the pump as shown, and is driven by a motor, as described above.

The path of the material 436 being dispensed begins in the dispensing container 430. In this example, the container comprises a syringe 22 having a plunger 410. The volume of air 440 above the plunger is sealed by syringe cap 411, and has a pressure value, for example, positive, negative, or zero, pressure, that is controlled by the air pressure/vacuum unit 402. Under positive air pressure applied to the plunger 410, for example ranging from 1-10 psi, fluid material is dispensed from the syringe at outlet 32 and through feed tube 40, and is introduced into the body of the pump cartridge 60, at port 100 as described above at a desired rate, for example such a rate as to avoid cavitation of the dispensed material. An elongated inlet port 100 for introducing the material to the feed screw is preferred, as described above. The material flows thorough the inlet port 100, where it interfaces with a side portion of the feed screw 74. Rotation in the feed screw 74 in the first clockwise direction 408, induced by motor 42, as described above, propels the material in a downward direction toward the dispense tip 82 outlet port. The rotation of the auger screw 74, in combination with the positive air pressure generated at the air pressure/vacuum unit 402 and operating on the plunger 410, causes material to be dispensed at the dispense tip 82 in metered fashion, as described above. A suitable pressure level is determined based on many factors, including the viscosity of the fluid, the volume of the reservoir, the width and length of the feed path, and the like. Too much applied pressure would overcome the auger metering capability and would push material through the screw; too little applied pressure would cause voids to appear in the dispensed material.

An air seal, for example, in the form of an O-ring 412, is provided about an upper portion of the neck, or body, of the rotatable auger screw shaft 66 in order to form an airtight seal at the top portion of the material flow path in the cartridge 70. The O-ring preferably allows for free rotation of the shaft 66 therein, while providing a substantially air tight seal therewith. The O-ring may be formed, for example, of a Viton™ material, or silicone rubber material, and is positioned by a containment washer 414, which, in turn, is secured by an auger collar 416 and a threaded spanner nut 418. In this manner, the material path is sealed along the path from the plunger 410 to the material inlet port 100, to the dispense tip 82 outlet port of the pump 432. The seal operates to prevent ambient air external to the pump body from compromising the positive or negative pressure applied to the material by the plunger 410 and air pressure/vacuum unit 402.

Figure 18B:
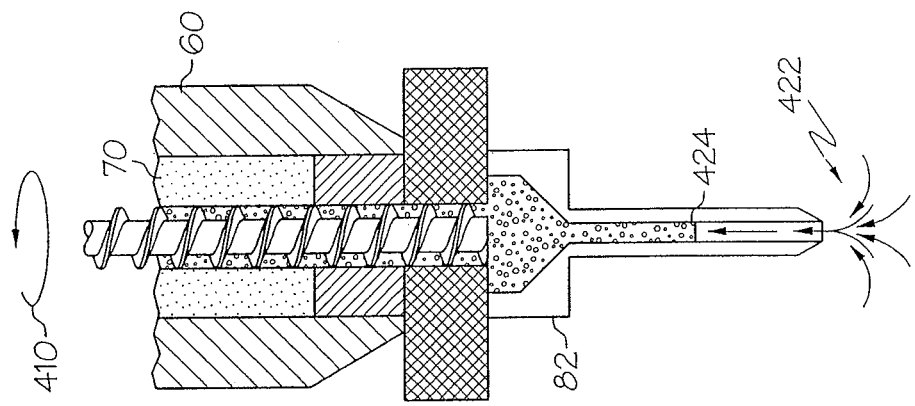
FIGS. 18A and 18B are cross-sectional closeup views of the dispensing pump of FIG. 17, illustrating the operation of the induced vacuum and the reverse motion of the auger screw, in accordance with the present invention.
Figure 18A:
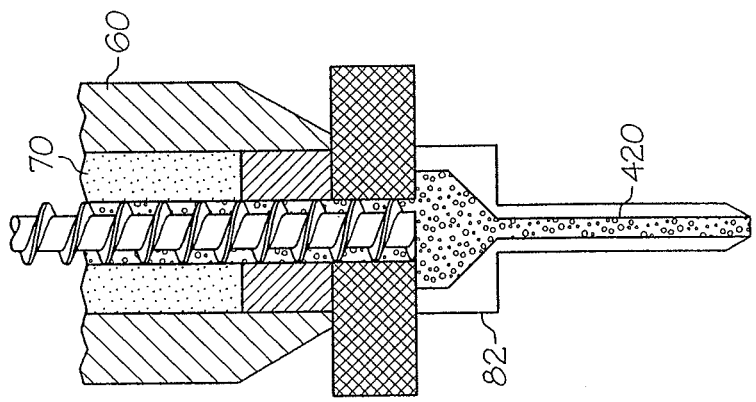

With reference to FIG. 18A, following a dispensing operation, material 420 is present at the outlet of the dispense tip 82. As described above, this material 420 can become dislodged from the dispense tip at an undesired time subsequent to the dispensing operation, leading to dispensing of an excessive volume of material, or, in the event that the substrate and/or pump is in motion, leading to dispensing of material at an undesired location on the substrate.

The present invention mitigates or eliminates the likelihood of erroneous dispensing by suspending the flow of material in the material flow path. This suspension of material flow can, in one embodiment, take the form of a reverse suction, or siphon, that is applied to the material flow path. In another embodiment, prevention of the forward flow of material at the dispense tip can be achieved by suspending the material in place in a manner that not require outright reverse suction or siphon of the material flow path, but rather prevents forward flow of material, for example, by reducing the applied positive pressure, or by constricting the fluid path. In either case, such action results in suspension of the forward flow of material, and, if desired, may optionally cause an inward draw of the material 422 at the outlet of the dispense tip, as shown in FIG. 18B.

In one example, material suspension is accomplished by applying a negative pressure, for example −1 psi, to the volume 440 above the plunger 410 (see FIG. 17). For example, a vacuum 406 can be drawn on the plunger by the air pressure/vacuum unit 402 to oppose its further movement in a downward direction. Because the system is substantially sealed from ambient air between the plunger 410 and the outlet of the dispense tip 82, the evacuation of the air, the force of which operates on the plunger 410, is translated to the material at the outlet of the dispense tip 82, which, in turn suspends the material, or, optionally, draws the material in a reverse direction. In either case, the inadvertent dispensing of material is prevented. In general, the stronger the applied negative pressure, the stronger the inward draw of the material at the outlet port 82. Depending on the viscosity of the material, suspension of the material may be achieved by reducing the amount of applied positive pressure, rather than by applying negative pressure.

In some cases, depending on the viscosity or surface tension of the material, for example in the case of a self-leveling, low-viscosity material, a plunger is not needed for applying the positive and/or negative pressure to the material. In this case, positive and/or negative pressure is applied directly to the upper surface of the material, and a plunger is not used.

Figure 19A:
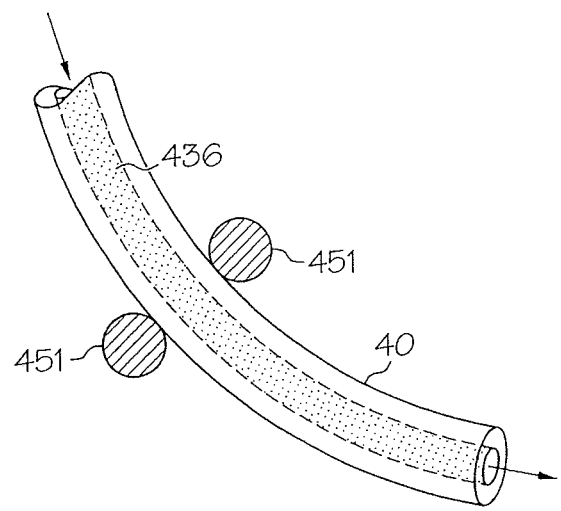
FIGS. 19A and 19B are side conceptual views of a mechanism for pinching the feed tube, in accordance with the present invention.
Figure 19B:
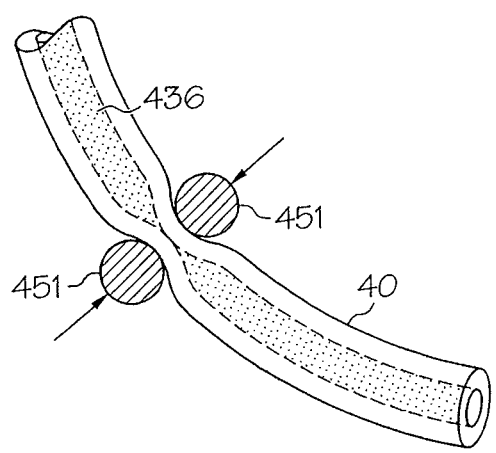

In another example, forward material flow, and therefore inadvertent dispensing of material, can be prevented by constricting material path, for example at the feed tube 40. With reference to FIGS. 19A and 19B, assuming the feed tube 40 to be formed of an elastically compressible material, single, or multiple rollers or pinchers 451 are adapted for inward and outward movement. During a dispensing operation, the rollers 451 are spaced apart, and allow material 436 to freely flow through the feed tube 40. Following the dispensing operation, the rollers 451 move inward relative to each other, constricting the feed tube, and therefore closing off the introduction of material 436. Assuming a substantially sealed material path, between the rollers 451 and the dispense tip outlet 82, as described above, the pinching of the feed tube 40 in this manner results in suspension of the material at the outlet 82.

In an alternative embodiment, mechanical means may be provided for applying downward or upward pressure on the plunger, as needed, in order to induce material flow and material suspension.

As an alternative to, or in addition to, suspension of the material flow path to prevent inadvertent dispensing, the pump motor 42 (see FIG. 1A), which normally operates to rotate the auger screw in a first direction, for example a clockwise direction 408, during a dispensing operation, can be made to counter-rotate in a second, reverse, direction, for example in a counterclockwise direction 409 for a predetermined length of time. In this manner, a reverse pumping motion is placed on the fluid path, causing the fluid to be drawn in an upward direction, as shown in FIG. 18B. With the reverse pumping motion, the material is suspended, or drawn inward, as described above. Since the material path is sealed by the O-ring 412, ambient air does not compromise the material suspension, and therefore, the material is prevented from being inadvertently dispensed at the outlet 82.

In a preferred embodiment, both operations are performed to enhance the resulting suspension of the dispensed material. For example, a suspension, or a negative pressure, is placed on the material path and a reverse motion is imparted on the auger screw. The operations may be performed simultaneously, or subsequent to one another, depending on the application.

The use of a closed-loop servo motor, as described above, allows for enhanced control over the operation of the reverse rotation imparted on the auger screw. For example, the speed and acceleration of the auger can be controlled, as described above, to enhance the suspension or siphoning action. This, in combination with the dispensing controller described above for timing the operation of the motor and air pressure/vacuum unit, provides a system and method that mitigates or prevents unwanted release of fluid at the dispense tip following a dispensing operation, or between subsequent dispensing operations.

At the start of the next dispensing operation, the negative pressure-induced, or otherwise-induced suspension of the material, is removed, positive pressure is applied, and the motor resumes rotation in the positive direction. During the previous cycle, assuming that the motor was used to impart reverse motion on the feed screw, as described above, the number of counts of reverse motion are retained, and the motor is preferably returned to its original position prior to resuming motion in the positive direction.

While this invention has been particularly shown and described with reference to preferred embodiments thereof, it will be understood by those skilled in the art that various changes in form and detail may be made herein without departing from the spirit and scope of the invention as defined by the appended claims.

For example, the enhanced control over material flow offered by the various configurations of the present invention make the pump system of the present invention especially amenable to use with dispense needles having a flat dispensing surface with a cross pattern formed in the dispensing surface for dispensing cross patterns for providing a fillets for boding a die to a substrate. Particularly, since the closed-loop servo motor pump of the present invention offers control over both position and velocity of the feed screw, the delivery of fluid through the needle to the cross pattern can be controlled to a level of precision previously unattainable. Cross-pattern-style fillets can be achieved at a level of accuracy orders of magnitude beyond those currently achieved.

In addition, although the exemplary mechanisms described above for placing the material in suspension include applying reverse pressure to the reservoir, pinching the feed tube, and reversing the direction of the motor, other mechanisms capable of placing the material under suspension are equally applicable to the present invention.

I claim:

1. A material dispensing pump comprising:
   a closed-loop servo-motor having indexed rotational positions;
   a dispensing controller that generates control signals to control the servo-motor, wherein the servo-motor performs a dispensing operation in response to the control signals;
   a housing having an opening;
   a removable cartridge assembly positioned in the opening, the cartridge assembly having a cavity, an inlet port, an outlet port in communication with the cavity, and a feed mechanism extending through the cavity, the feed mechanism including a cylindrical neck and a feed path, the feed path being substantially sealed from ambient air between the inlet port and the outlet port by a seal positioned about the neck between the neck and the cartridge assembly and a threaded spanner nut that applies pressure in a direction along a longitudinal axis of the neck and that retains the seal in position about the neck, wherein the seal substantially seals the feed path from ambient air, the closed-loop servo-motor driving the feed mechanism during the dispensing operation;
   a pressure unit for applying positive pressure to cause material to be presented to the inlet port at a desired rate during the dispensing operation such that the material flows through the feed path toward the outlet port; and
   a material suspension unit for placing the material in the substantially sealed feed path in suspension following the dispensing operation.

2. The material dispensing pump of claim 1, wherein the control signals control at least one of the rotational position, the angular velocity, and the angular acceleration of the servo-motor during the dispensing operation.

3. The material dispensing pump of claim 1 further comprising a Position controller that controls the position of the pump relative to a substrate.

4. The material dispensing pump of claim 3, wherein the position controller operates in conjunction with the dispensing controller, wherein when the position controller generates a time-based signal to the dispensing controller, the dispensing controller initiates the dispensing operation in response to the time-based signal by generating a control signal to control the feed mechanism based on the indexed rotational positions.

5. The material dispensing pump of claim 1 further comprising a material reservoir in communication with the inlet port, the material reservoir containing the material to be dispensed during the dispensing operation.

6. The material dispensing pump of claim 5 further comprising a feed tube coupled between the material reservoir and the inlet port.

7. The material dispensing pump of claim 6 wherein the feed tube comprises an elastically compressible material and wherein the material suspension unit comprises means for constricting the feed tube to place the material in suspension.

8. The material dispensing pump of claim 7, wherein the material reservoir comprises a syringe and wherein the positive pressure is applied to the material in the syringe.

9. The material dispensing pump of claim 8, wherein the material suspension unit applies a negative pressure to the material following the dispensing operation to place the material in the substantially sealed feed path in suspension.

10. The material dispensing pump of claim 9, wherein the negative pressure comprises a vacuum provided by the pressure unit and drawn on the material in the syringe.

11. The material dispensing pump of claim 1, wherein the material suspension unit places the material in the substantially sealed feed path in suspension by applying a negative pressure to the material.

12. A method for dispensing material comprising:
   prior to a dispensing operation of material to be dispensed:
      positioning a removable cartridge assembly positioned in an opening of a housing of a material dispensing pump, the cartridge assembly having a cavity, an inlet port, an outlet port in communication with the cavity, and a feed mechanism extending through the cavity, the feed mechanism including a cylindrical neck and a feed path, the feed mechanism positioned such that the feed path is substantially sealed from ambient air by positioning a seal about the neck between the neck and the cartridge assembly and providing a threaded spanner nut that applies pressure in a direction along a longitudinal axis of the feed mechanism and that positions the seal about the neck, wherein the seal substantially the feed path from ambient air;
   during a dispensing operation of material to be dispensed:
      driving the feed mechanism with a closed-loop servo-motor having indexed rotational positions; and
      applying positive pressure to the material to cause material to be presented to the feed path at a desired rate; and
   following the dispensing operation, placing the material in the substantially sealed feed path in suspension.

13. The method of claim 12, wherein the material in the substantially sealed feed path is placed in suspension by applying negative pressure to the material.

14. The method of claim 12 further comprising controlling the position of the pump relative to a substrate during the dispensing operation, wherein controlling the position of the pump is synchronized with controlling a rotational position, an angular velocity, and an angular acceleration of the servo-motor.

15. The method of claim 12 further comprising providing the material from a material reservoir in communication with the feed path.

16. The method of claim 15 further comprising coupling an elastically compressible feed tube between the material reservoir and the feed path, and constricting the feed tube to suspend the flow of material.

17. The method of claim 12 further comprising controlling a rotational position, an angular velocity, and an angular acceleration of the servo-motor during the dispensing operation.

* * * * *

UNITED STATES PATENT AND TRADEMARK OFFICE
CERTIFICATE OF CORRECTION

| | |
|---|---|
| PATENT NO. | : 8,701,946 B1 |
| APPLICATION NO. | : 13/534703 |
| DATED | : April 22, 2014 |
| INVENTOR(S) | : Jeffrey P. Fugere |

Page 1 of 1

It is certified that error appears in the above-identified patent and that said Letters Patent is hereby corrected as shown below:

In the Claims

Col. 18, Line 30, Claim 12, insert the word -- seals -- between the words "substantially" and "the"

Signed and Sealed this
Eighth Day of July, 2014

Michelle K. Lee
*Deputy Director of the United States Patent and Trademark Office*